Oct. 24, 1961     B. N. LEVERETTE     3,005,645
FASTENER
Filed March 11, 1959
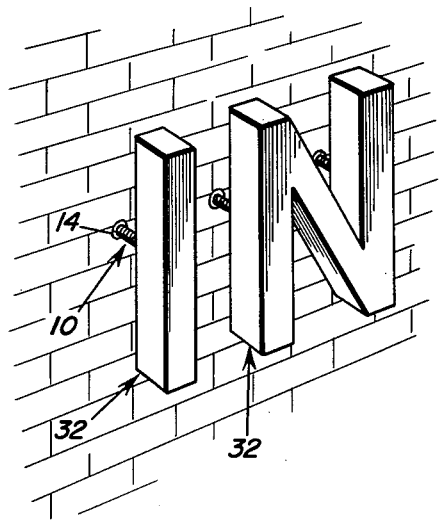
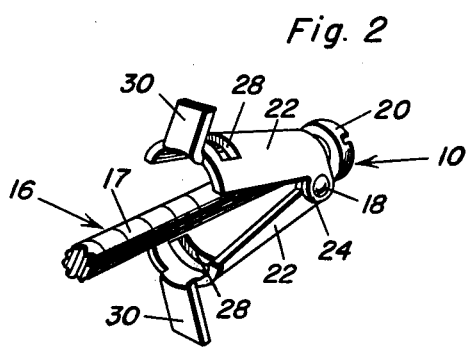
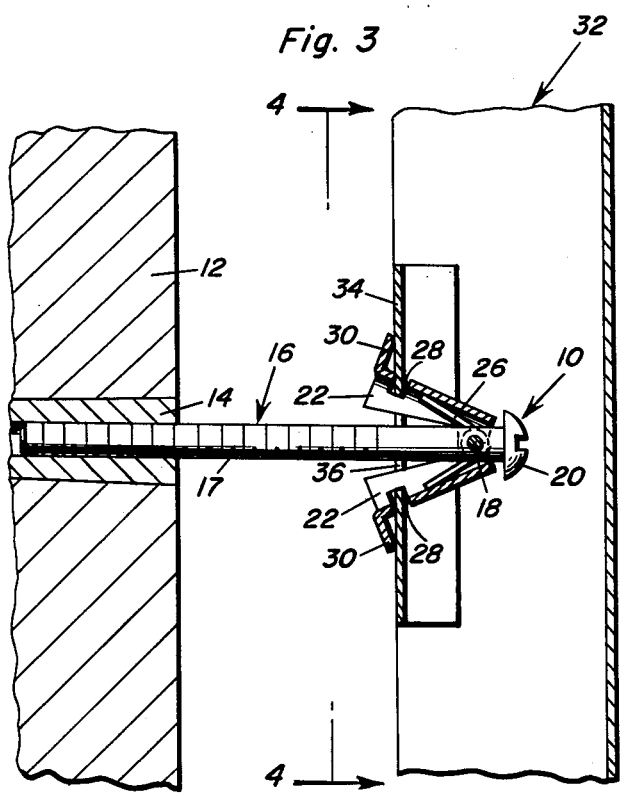
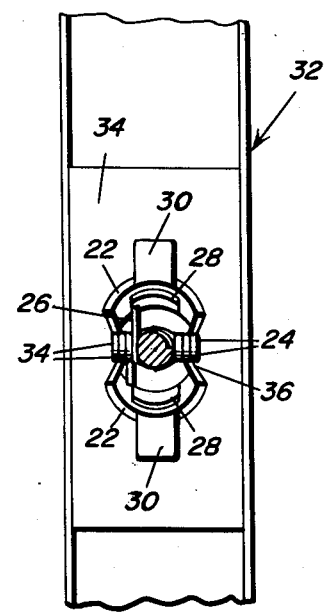
Bobby N. Leverette
INVENTOR.

__United States Patent Office__ 3,005,645
Patented Oct. 24, 1961

3,005,645
FASTENER
Bobby N. Leverette, P.O. Box 66, Ambrose, Ga.
Filed Mar. 11, 1959, Ser. No. 798,671
5 Claims. (Cl. 287—23)

This invention relates to a new and useful fastener and more particularly to a fastener which is adapted to removably secure an object to a supporting surface either spaced therefrom or in abutting relation thereto.

In many instances it is desired to have an object secured to a supporting surface without any outward evidence of a fastener being used. Further, it is sometimes desirable to have a fastener which will support an object in spaced relation from the supporting surface to which the fastener is secured. Especially in the sign art, when it is desired to have letters of a sign stand out from the background, it is most desirable to have a fastener which will enable rapid removal and/or replacement of the letters of a sign, especially when the sign is of a billboard type necessitating that the message of the sign be frequently changed.

It is therefore the main object of this invention to provide a fastener for removably securing an object to a supporting surface without any outward evidence of a fastener or support being used.

A further object of this invention, in accordance with the preceding object, is to provide a fastener for letters of signs and the like which will position the letters a spaced distance from the background of the sign.

A still further object, in accordance with the preceding objects, is to provide a sign fastener which will be capable of securing letters of a sign to the background thereof in adjusted spaced relation therefrom.

Still another object, is to provide a fastener which will take hold immediately as one end thereof is inserted into an aperture formed in the surface of a letter adjacent the supporting surface therefor.

Yet another object, in accordance with the preceding object, is to provide a fastener having means thereon to prevent it from being inserted entirely through an aperture.

The final object to be specifically enumerated herein is to provide a fastener which will lend itself to conventional forms of manufacture and therefore be relatively inexpensive to produce.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the letters of a sign shown in the manner in which they would appear when being supported upon a wall in spaced relation therefrom by means of the fasteners comprising the present invention;

FIGURE 2 is an enlarged perspective view of the fastener shown with the arms thereof in an expanded position;

FIGURE 3 is a sectional view of the fastener taken substantially upon the longitudinal center line thereof, shown fastened to a supporting surface with a letter being removably secured thereto, parts of the supporting surface and the letter being broken away; and FIGURE 4 is a vertical sectional view taken substantially upon the plane indicated by the section line 4—4 of FIGURE 3.

Referring now more specifically to the drawings the numeral 10 generally designates the fastener comprising the present invention which is shown secured to a supporting surface 12 by means of an expansion plug 14. The fastener 10 comprises a bolt 16 having a threaded shank 17 to which is pivotally secured a pair of arms 22 by means of pin 18 which extends transversely through bolt 16 adjacent the head 20 thereof.

The arms 22 are substantially semi-cylindrical and each has at its inward end a pair of parallel spaced lugs 24 which have aligned bores (not shown) formed therethrough. The arms 22 are each pivotally secured at their outer ends to bolt 16 by means of transverse pin 18 which is journalled through the aligned bores formed through each pair of lugs 24, said pairs of lugs being in overlapping relation. Also secured about transverse pin 18 is wire spring 26 whose ends frictionally engage and yieldingly retain arms 22 in extended relation.

Formed in the outer surface of each arm 22 and adjacent the inward end thereof is a transverse notch 28. Also, each arm 22 terminates at its free end in a flange 30 which extends laterally therefrom away from bolt 16. It will be noted, since they are semi-cylindrical, that the arms 22 may be urged toward a folded position against the threaded bolt 16 with the flanges 30 extending at right angles therefrom.

With attention now drawn more particularly to FIGURE 3 of the drawings, the numeral 32 generally designates a letter of a sign which has secured across the back edge thereof a transverse support plate 34 having an aperture formed therein which is slightly larger in diameter than the length of the transverse pin 18.

In operation, the fastener 10 is first secured within expansion plug 14 with its head 20 positioned the desired distance from the supporting surface 12. The arms 22 are then moved to a closed position against the threaded bolt 16. The free end of the fastener 10 may then be inserted into the aperture 36. It is to be understood that the aperture 36 while being larger in diameter than the length of the transverse pin 18, it is not larger in diameter than the distance between the remote ends of the flanges 30 when the arms 22 are in the folded position against the threaded bolt 16. Thus, flanges 30 restrict the fastener 10 from being inserted entirely through the aperture 36. After the flanges 30 have limited the penetration of the fastener 10 through aperture 36, the arms 22 may be released whereupon they will be urged toward the extended position by the spring 26 and the notches 28 will engage the sides of the aperture 36 retaining the letter 32 in position upon the fastener 10.

With attention drawn now to FIGURE 3, it will be noted that the end of each arm 22 adjacent the bolt head 20 is but slightly spaced from the adjacent surface of the threaded bolt 16 when the arms 22 are engaging the sides of the aperture 36, and it is to be understood that the shank 17 of bolt 16 will act as a stop surface for the arms 22 to limit their resilient outward movement. Thus, it is to be understood that as the fastener 10 is inserted into the aperture 36, that the sides of the aperture 36 will engage the remote surfaces of the arms 22 and urge them towards a folded position as the fastener 10 is further inserted through aperture 36 until flanges 30 restrict the further insertion of the fastener 10 therethrough.

Further, although the conventional type of expansion plug 14 has been shown as a means to secure the threaded bolt 16 to a solid supporting surface 12 it is to be understood, that any convenient means may be employed for securing the fastener to a supporting surface. Also if it is desired to secure the fastener to a hollow wall or the like, it is to be understood that in place of the expansion plug 14 any convenient well-known anchoring device may be secured to the end of bolt 16 on the end remote from head 20 such as that which is disclosed in the patent to Zifferer No. 1,224,698 dated May 1, 1917.

Also, should it be desired to mount a letter or the like flush against the supporting surface, it is to be understood that the threaded bolt 16 could be positioned with its head 20 closer to the support surface 12 and that the transverse support plate 34 could be recessed from the rear edge of the letter 32 so that the free ends of the arms 22 would not abut against the supporting surface.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fastener for use in securing an article to a supporting member comprising an elongated body having one end adapted for fixed mounting upon said supporting member and adapted at its other end for connection with an article to be mounted having a supporting plate with an opening formed therethrough, said other end having a plurality of arms, means pivotally connecting the outer end of each arm to said other end for movement about an axis extending transversely of said body, means engaging said arms for urging their inner free ends away from each other and from said body, a laterally extending flange formed on the inner end of each arm, said flanges extending away from said arms and from each other and adapted to engage the surfaces of said plate about the opening formed therethrough to restrict complete passage of said arms through said opening, said arms upon their outer surfaces, spaced slightly inwardly of said flanges and adjacent their inner ends having means for engaging portions of said plate surrounding said opening through which said body projects whereby said urging means will expansively fasten said arms to said plate, said engaging means including recesses for receiving therein the adjacent portions of the rim of said opening in said plate whereby said recesses and said flanges will restrict movement of said fastener in either direction through said opening.

2. The combination of claim 1 including a pair of parallel spaced and apertured lugs on the outer ends of each arm, said pairs of lugs being in overlapping relation with the apertures in alignment, said pivotal connecting means comprising a transverse pivot pin extending through said member with its opposite ends secured through said aligned apertures.

3. The combination of claim 1 including a pair of parallel spaced and apertured lugs on the outer end of each arm, said pairs of lugs being in overlapping relation with the apertures in alignment, said pivotal connecting means comprising a transverse pivot pin extending through said member with its opposite ends secured through said aligned apertures, said urging means comprising a wire spring disposed about said pivot pin with its ends engaging the confronting surfaces of said arms.

4. The combination of claim 1 wherein said arms are semi-circular in cross section.

5. The combination of claim 1 wherein said arms are semi-circular in cross section, the outer ends of said arms extending beyond said pivotal connection and comprise stops which engage the outer end of said elongated body to limit the swinging movement of said arms toward the expanded position.

References Cited in the file of this patent

UNITED STATES PATENTS

| | | |
|---|---|---|
| 1,181,336 | Mutton | May 2, 1916 |
| 1,203,669 | Whiteside | Nov. 7, 1916 |
| 1,396,278 | Paine | Nov. 8, 1921 |
| 1,647,986 | Dickinson | Nov. 8, 1927 |